(12) United States Patent
Gauthier et al.

(10) Patent No.: US 8,961,778 B2
(45) Date of Patent: Feb. 24, 2015

(54) HEAVY FEED HYDROCONVERSION METHOD IN EBULLATED BED MODE WITH FEED INJECTION AT THE REACTOR TOP

(75) Inventors: Thierry Gauthier, Brignais (FR); Jan Verstraete, Lyons (FR); Simon Maget, Lyons (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 1154 days.

(21) Appl. No.: 12/742,293

(22) PCT Filed: Oct. 24, 2008

(86) PCT No.: PCT/FR2008/001504
§ 371 (c)(1),
(2), (4) Date: Aug. 24, 2010

(87) PCT Pub. No.: WO2009/092877
PCT Pub. Date: Jul. 30, 2009

(65) Prior Publication Data
US 2011/0036752 A1     Feb. 17, 2011

(30) Foreign Application Priority Data
Nov. 12, 2007   (FR) .................................... 07 07930

(51) Int. Cl.
| C10G 47/26 | (2006.01) |
| C10G 49/12 | (2006.01) |
| B01D 19/00 | (2006.01) |
| B01J 8/18 | (2006.01) |
| B01J 8/22 | (2006.01) |
| C10G 45/00 | (2006.01) |
| C10G 47/00 | (2006.01) |
| C10G 49/00 | (2006.01) |

(52) U.S. Cl.
CPC ................ *C10G 47/26* (2013.01); *C10G 49/12* (2013.01); *B01D 19/0057* (2013.01); *B01J 8/1872* (2013.01); *B01J 8/22* (2013.01); *C10G 45/00* (2013.01); *C10G 47/00* (2013.01); *C10G 49/00* (2013.01); *B01J 2208/00283* (2013.01); *B01J 2208/00557* (2013.01)
USPC ................................ 208/108; 208/59; 208/86

(58) Field of Classification Search
USPC ........................ 208/59, 108, 111.35
See application file for complete search history.

(56) References Cited

U.S. PATENT DOCUMENTS

| 3,888,761 | A | * | 6/1975 | Stewart ......................... 208/112 |
| 6,187,174 | B1 | * | 2/2001 | Morel et al. ................... 208/213 |
| 6,280,606 | B1 | | 8/2001 | Morel et al. |
| 6,755,962 | B2 | * | 6/2004 | Banerjee ......................... 208/67 |

FOREIGN PATENT DOCUMENTS

WO     PCTFR0801504 R     7/2009

OTHER PUBLICATIONS

Gauthier, Thierry et al. "Impact of vaporization in a residue hydroconversion process." (Chemical Engineering Science), Dec. 20, 2006, 5409-5417,vol. 62.

* cited by examiner

*Primary Examiner* — Renee E Robinson
(74) *Attorney, Agent, or Firm* — Millen, White, Zelano, Branigan, P.C.

(57) ABSTRACT

The invention relates to a method of hydroconverting in ebullated bed mode a petroleum feed containing a significant amount of light fractions and, among other things, asphaltenes, sulfur-containing and metallic impurities.
More precisely, the object of the invention is a hydroconversion method using at least one ebullated-bed reactor for which injection of the feed is carried out at the top of said reactor, in the gas overhead, and involving separation within said feed inside the reactor into a vaporized fraction and a liquid fraction.
The invention also relates to the reactor allowing said method to be implemented.

20 Claims, 3 Drawing Sheets

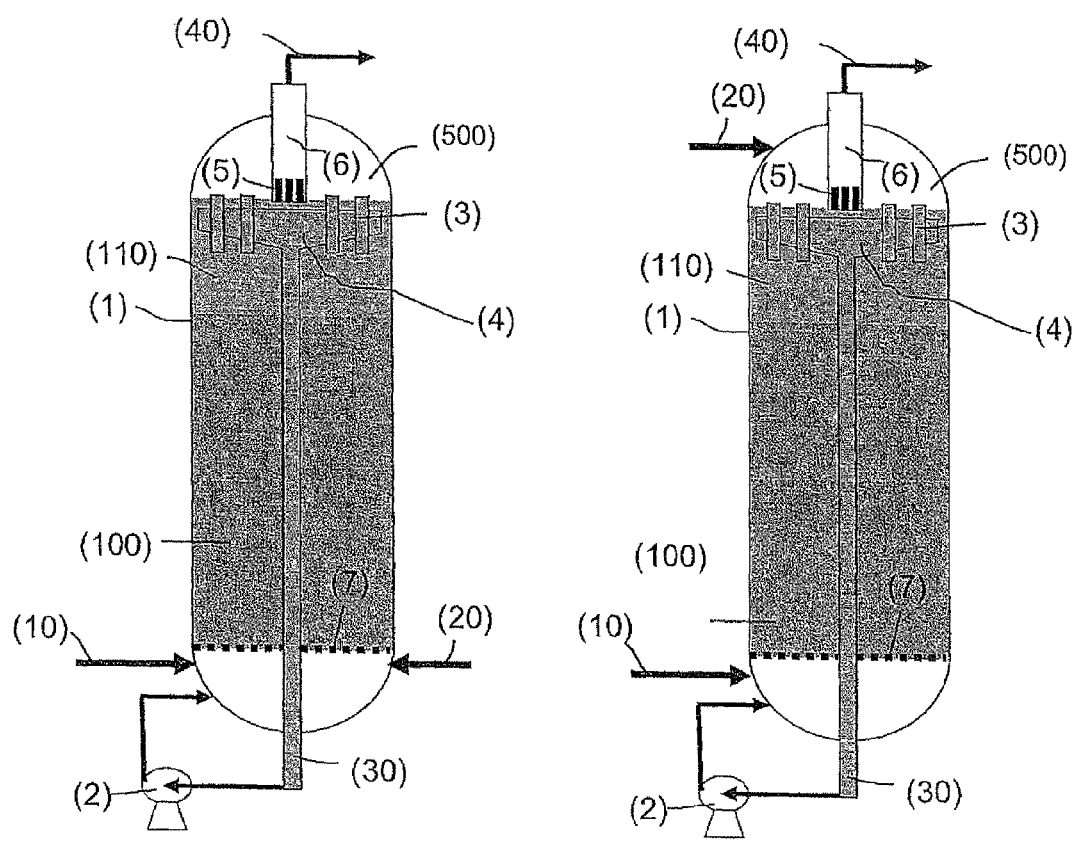
FIGURE 1: prior art
Figure 2: invention

HEAVY FEED HYDROCONVERSION METHOD IN EBULLATED BED MODE WITH FEED INJECTION AT THE REACTOR TOP

FIELD OF THE INVENTION

The invention relates to a petroleum feed hydroconversion method in ebullated bed mode. It notably allows to directly process crude feeds, thus allowing integration thereof in conventional refining schemes. It also allows to improve the reactional implementation of hydroconversion.

BACKGROUND OF THE INVENTION

Heavy feed hydroconversion in ebullated bed mode has been used for over 50 years and it has undergone many evolutions that have formed the subject of many patents and publications.

In 1968, S. B. Alpert et al. described in document U.S. Pat. No. 3,412,010 a method wherein the feed is fed with hydrogen into the bottom of the reactor in a distribution box arranged below the catalytic bed, and mixed with part of the recycled liquid withdrawn downstream from the catalytic bed.

Recently, an article by Rana et al. (Fuel, 86, 1216-1231, 2007) described the method and the operating conditions characteristic of ebullated-bed reactors for residues hydroconversion.

A large number of patents describe that a hydrocarbon feed is introduced with hydrogen and the fluids flow in ascending mode through a catalyst bed under velocity conditions allowing fluidization of the catalyst and therefore expansion of the bed. The latter are also provided by recycling a liquid fraction circulating in a recycle line and a recycle pump allows the liquid to be reinjected into the reactor bottom. Further details are given, among other things, in documents U.S. Pat. Nos. 6,153,087, 6,436,279, 3,412,010, 4,792,391 and 4,990,241.

Among these documents, it can be noted that FIG. 1 of documents U.S. Pat. Nos. 4,792,391 and 4,990,241 perfectly describe the injection of the feed and of the hydrogen into the reactor bottom.

Besides, document GB-2,126,494 describes a particular device allowing injection of the gas and of the liquid into the reactor bottom.

Furthermore, patent U.S. Pat. No. 6,280,606 describes a method of converting a hydrocarbon fraction resulting from atmospheric distillation, followed by vacuum distillation of a petroleum crude. Distillation of the crude allows to separate a vacuum distillate (VD) and a vacuum residue (VR) that are then respectively subjected to hydrotreatment and hydroconversion in ebullated-bed reactors. The feed fed into the hydroconversion reactor is essentially liquid under the conditions of the process.

When the refiner wishes to upgrade a crude containing heavy fractions in large amounts, it may be advantageous to upgrade the heavy crude through moderate conversion and partial desulfurization so as to make the crude thus treated easier to integrate in conventional refining schemes. This operation is carried out in the vicinity of production sites through combination of atmospheric distillation, vacuum distillation and hydroconversion operations but this combination with a conventional refining complex is expensive. In some cases, it would therefore be advantageous to do without the distillation operation upstream from the hydroconversion process.

The applicant has found that it is possible to provide a new method allowing to carry out ebullated-bed hydroconversion of heavy feeds containing a significant proportion of vaporizable fractions under the hydroconversion conditions, without requiring initial upstream fractionation of the feed and without altering operation of the hydroconversion reactor.

The method according to the invention uses both injection of the feed to be treated into the top of the ebullated-bed hydroconversion reactor in the gas overhead and a device internal to the reactor for separation of the vaporizable fraction and of the liquid fraction.

The method according to the invention is advantageously applied for hydroconversion of petroleum feeds, notably for direct treatment, i.e. in the absence of a distillation stage upstream from said process, of crudes containing a significant fraction (above wt. 10%) of compounds whose boiling-point temperature is below 340° C.

The method according to the invention is particularly well suited for hydroconversion of crudes, preferably desalted, after flash under the temperature and pressure conditions at the crude production well outlet.

SUMMARY OF THE INVENTION

The invention relates to a hydroconversion method using at least one ebullated-bed reactor for which injection of the feed is carried out at the top of said reactor, in the gas overhead, and involving separation of said feed inside the reactor into a vaporized fraction and a liquid fraction.

The liquid fraction is subjected to the hydroconversion reactions and the vaporized fraction is extracted in gaseous fowl at the reactor top with the hydroconverted liquid effluent.

The invention also relates to the reactor allowing said method to be implemented.

BRIEF DESCRIPTION OF THE DRAWINGS

FIG. 1 illustrates an ebullated-bed hydroconversion method according the related art.

FIG. 2 illustrates an ebullated-bed hydroconversion method according to the disclosed embodiments.

DETAILED DESCRIPTION

Figure 3:
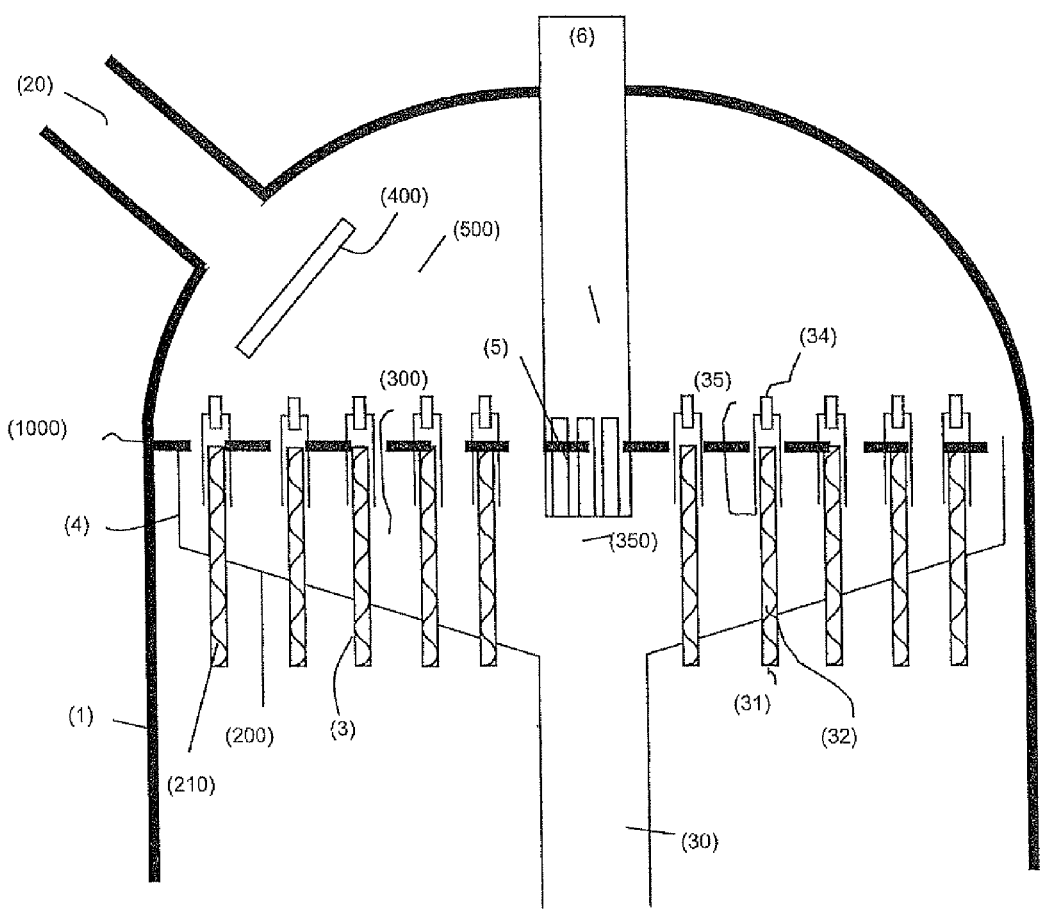
FIG. 3 illustrates an upper part of a reactor according to the disclosed embodiments.

The object of the invention is a method of hydro converting a heavy petroleum feed in an ebullated-bed reactor, comprising:

a) injecting said feed at the top of the reactor in the gas overhead, b) separating said feed within the reactor into a vaporized fraction, under the temperature and pressure conditions of the reactor, and a liquid fraction, c) in said reactor, contacting said liquid fraction with at least one hydroconversion catalyst with hydrogen under such conditions that the absolute pressure ranges between 3 and 50 MPa, the temperature between 300° C. and 550° C., the hourly space velocity between 0.05 and 5 h$^{-1}$, and obtaining a hydroconverted effluent, d) extracting said vaporized fraction and a fraction of the hydroconverted effluent at the reactor top, e) recycling the non-extracted hydroconverted effluent fraction.

The feed treated within the scope of the present invention is a petroleum feed containing at least 30% by weight of compounds whose boiling-point temperature is above 350° C., as well as a significant amount of light fractions, i.e. at least 10% by weight of compounds whose boiling-point temperature is below 340° C.

Generally, the global metal content of the feed is above 50 ppm by weight, or even 100 ppm by weight, and the global sulfur content is above 2% by weight.

Preferably, the treated feed contains a significant amount of vacuum residue, so that at least 20% by weight of the compounds have a boiling-point temperature above 540° C. More preferably, the feed contains at least 40% by weight of compounds whose boiling-point temperature is above 540° C.

It can be selected from among:
vacuum distillates,
atmospheric residues,
direct-distillation vacuum residues,
deasphalted residues,
residues from conversion processes such as coking for example,
crude oils, notably Arabian light crudes, Arabian heavy crudes, Ural, Zuata, Boscan, Athabasca, Kuito and Duri,
bitumen extracted from oil shale or bituminous sand deposits,
liquid feeds resulting from fixed-bed hydroconversion, such as those obtained from HYVAHL® heavy crude treating processes developed by the applicant,
liquid feeds resulting from ebullated-bed heavy crude hydrotreatment methods, such as those from HOIL® processes,
solvent-deasphalted oils, for example using propane, butane or pentane,
asphalts (alone or in admixture) usually obtained from deasphalting of direct-distillation vacuum residues or vacuum residues from H-OIL® or HYVAHL® processes, alone or diluted by a hydrocarbon-containing fraction or a mixture of hydrocarbon-containing fractions selected from the group made up of light cycle oils (LCO), decanted oils (DO), residual fractions from cracking processes that may contain catalyst fine suspensions (referred to as slurries) and gas oil fractions, notably those obtained by vacuum distillation, commonly referred to as vacuum gas oil (VGO).

Preferably, the feed is a crude oil.

The feed can also consist of a mixture of these various fractions in any proportion.

The feed can also contain:
gas oil and heavy gas oil cuts from catalytic cracking, generally having a distillation interval from about 150° C. to about 370° C., or 600° C. or above 600° C.,
aromatic extracts obtained within the scope of lubricating oils manufacture,
biomass treatment process effluents.

One major advantage of injecting the feed at the reactor top into the gas overhead is that it allows direct treatment, in the absence of a distillation stage upstream from the ebullated-bed hydroconversion zone, of a petroleum feed containing a significant fraction of light products.

Another advantage of injecting the feed at the reactor top into the gas overhead is to prevent contact with the catalytic bed of the vaporizable fraction under the reactor temperature and pressure conditions and thus to obtain higher contact efficiency between the catalyst and the liquid phase since the conversion and desulfurization reactions essentially take place in the liquid phase.

It is thus possible to optimize the operating conditions of the reactor and to obtain either a higher conversion level with the same proportion of catalyst as if injection of the feed was carried out conventionally, or an identical conversion level with a lower proportion of catalyst.

Another important advantage linked with the feed injection position is to facilitate operation of the reactor by limiting the presence of gas within the reactor. In fact, if the volume fraction occupied by the gas is too high, the catalyst fluidization quality and therefore expansion of the catalyst bed can be deteriorated. It is generally advisable that the gas retention in the bed be limited to 20-30% by volume.

Another advantage provided by the gas retention limitation in the catalyst bed is to limit foaming risks in the reactor, foaming being harmful to reactor operation and catalytic bed boiling control.

According to the method of the invention, the feed to be treated is injected at the reactor top, in the gas overhead and above the liquid level, as shown in FIG. 2. Said feed is separated by vaporization, by means of a dedicated device described below, into a vaporized fraction and a liquid fraction that is the only one to be subjected to hydroconversion. The vaporized fraction is rapidly extracted from the reactor. The vaporized fraction under the reactor temperature and pressure conditions generally represents 10 to 80% by weight of the 540° C.− fraction of the feed (540° C.−: compounds whose boiling-point temperature is below 540° C.), and preferably 20 to 70% of the 540° C.− fraction.

Injection of the feed is generally carried out as high as possible in the reactor so as not to be affected by the liquid level fluctuations, preferably at least 0.5 meter above the liquid level and more preferably at least 1 meter above the liquid level.

Injection can be performed through a single hole opening into the reactor, but multipoint injection, for example by means of a perforated ring, is also suitable.

The radial injection position has no determining advantage and injection can therefore be carried out through the wall as well as at the centre of the reactor through a penetrating tube.

Upstream from the injection into the reactor, the feed is optionally mixed with make-up hydrogen or a hydrogen-rich recycle gas. It is in fact preferable, but not necessary, to saturate the feed with hydrogen in order to prevent thermal degradation of the compounds and to optimize the flash conditions.

Hydroconversion is carried out in at least one three-phase reactor in the presence of hydrogen with at least one conventional ebullated-bed hydroconversion granular catalyst. This catalyst can comprise at least one group VIII metal, for example nickel and/or cobalt, most often in combination with at least one group VIB metal, molybdenum for example. It is possible to use for example a catalyst comprising 0.5 to 10% by weight of nickel or cobalt, preferably 1 to 5% by weight of nickel or cobalt (expressed in nickel or cobalt oxide), and 1 to 30% by weight of molybdenum, preferably 5 to 20% by weight of molybdenum (expressed in molybdenum oxide MoO3) on a support containing a mineral oxide preferably selected from the group consisting of alumina and silica. This catalyst is most often used in form of extrudates or balls, preferably extrudates of length ranging between 1 and 10 mm and of diameter ranging between 0.7 and 1.5 mm.

The hydroconversion reaction comprises at least one means of withdrawing the catalyst from said reactor and at least one means for supplying fresh make-up catalyst to said reactor. The used catalyst is partly replaced by fresh catalyst through progressive withdrawal (periodic or continuous), at the reactor bottom, of used catalyst and progressive introduction (periodic or continuous), at the reactor top, of fresh or new catalyst, for example at regular time intervals, i.e. by daily addition for example. The rate of replacement of used catalyst by fresh catalyst can be, for example, about 0.05 kg to about 10 kg per cubic meter of feed. This progressive withdrawal and replacement is carried out by means of devices allowing continuous operation of this hydroconversion stage. The reactor usually comprises a recirculation pump allowing the catalyst to be maintained under ebullated bed conditions by continuous recycling of at least part of the liquid withdrawn from the top of the reactor and reinjected at the bottom of the reactor.

The reactor usually operates at an absolute pressure of 3 to 50 MPa, preferably of 8 to 20 MPa, at a temperature ranging between 300° C. and 550° C., preferably between 380° C. and 450° C. The hourly space velocity (LHSV) of the liquid and the hydrogen partial pressure are important factors that are selected according to the characteristics of the feed to be treated and to the desired conversion. Most often, the LHSV ranges between 0.05 and 5 $h^{-1}$, preferably between 0.2 and 1 $h^{-1}$. Generally, the hydrogen partial pressure ranges between 4.5 and 40 MPa, preferably between 5 and 15 MPa. The hydrogen consumption generally ranges between 120 and 500 $Nm^3/m^3$ of feed.

Under such conditions, the conversion of the fraction having a boiling-point temperature above 540° C. to lighter products (in particular gasoline and gas oil) generally ranges between 25 and 90% by weight, preferably between 50 and 70% by weight.

The hydrodesulfurization rate generally ranges between 40 and 90% by weight, preferably between 60 and 80% by weight.

The method according to the invention is described for a single ebullated-bed reactor, but it advantageously applies in the case of a sequence of reactors of the same type, this sequence allowing the performances of the method to be improved in terms of conversion and desulfurization. The number of reactors in series is generally 1 to 3, more preferably 2. Thus, when several reactors are arranged in series with injection of the feed at the top for each reactor, the invention advantageously allows to do without the presence of interstage gas-liquid separator(s) as described for example in patent U.S. Pat. No. 6,270,654 filed by the applicant, all the more so since the feed introduced in a reactor downstream from the first reactor contains a vaporizable fraction (under the process conditions) that is larger than the feed of the first reactor considering the more advanced state of the reactions.

When the reactors are arranged in series, the effluent fraction extracted at the reactor top then makes up the feed of the next reactor.

In order to increase the processing capacity, several parallel trains of reactors in series can also be considered.

Preferably, the method according to the invention comprises no upstream distillation stage.

The object of the invention will be clear from reading the description hereafter of the non limitative embodiment examples illustrated by FIGS. 1 and 2.

FIG. 1 illustrates an ebullated-bed hydroconversion method according to the prior art, whereas FIG. 2 illustrates the method according to the invention.

In FIG. 1, the fresh feed (20), preheated to a temperature generally ranging between 300° C. and 500° C., is fed into a reactor (1) upstream from catalytic bed (100). It is mixed with hydrogen (10) that can be preheated to a temperature ranging between 100° C. and 1000° C., the latter being possibly mixed with a recycled gaseous effluent predominantly consisting of $H_2$, and with an internal liquid recycle (30). The mixture is distributed on the section of reactor (1) through means (7) such as a distribution plate consisting of a perforated plate, or a plate containing stacks with caps wherein the gas-liquid mixture flows. The surface velocity of the liquid in the reactor is such that it widely exceeds the minimum rate of fluidization of the catalyst particles (generally 1-mm diameter extrudates of length ranging between 2 and 10 mm). It is markedly below the minimum rate of particle transport in the presence of gas under the process conditions. The fluidization rate is optimally adjusted to allow expansion of the catalyst bed ranging between 10 and 50% by volume, preferably between 20 and 40% by volume. The liquid and the gas phase consisting of the hydrogen and the reaction products or constituents of the feed vaporized under the process conditions flow through catalyst bed (100). If the proportion of reaction products or of constituents of the feed vaporized under the process conditions is large, the room occupied by the gas in the reactor increases and it can exceed 20 to 30% of the volume fraction in the reaction zone. The volume fraction occupied by the liquid decreases then, thus limiting the performances.

A disengagement zone (110) wherein the amount of catalyst is very limited and depends only on the entrainment of the smaller particles of the catalytic bed is arranged above catalytic bed (100) whose height is determined by the catalyst inventory used and the fluidization conditions. The gas-liquid mixture flows then through gas-liquid separators (3) consisting for example of spiral tubes allowing centrifugation of the mixture to be induced. The liquid leaves these tubes on the periphery and overflows into a degassing vessel or recycle cup (4) wherein the velocity of the liquid is low to allow the gas bubbles to disengage upwards. A large part of the liquid of this vessel (or cup) is thus recycled to pumping means (2) through a recycling line (30). These pumping means allow to provide a sufficient liquid recycling flow rate to maintain an optimum fluidization rate in the reaction zone. In general, the recycled liquid flow corresponds to about 2 to 10 times the flow rate of fresh feed, preferably 3 to 6 times.

The gas fractions degassed in the separation system consisting of elements (3) and (4) leave the reactor through a plunging pipe (6) to gas outlet (40), through lateral openings (5) with the liquid fraction that is not recycled through line (30).

FIG. 2 (method according to the invention) comprises the various elements of FIG. 1, except that feed (20) is introduced at the top of the reactor in the gas overhead. In FIG. 2, no device allowing to improve separation of the vaporized fraction and of the liquid that is thereafter sent to catalytic bed (100) is shown.

The invention also relates to the reactor operating under ebullated bed conditions, in the presence of a catalyst, gas and liquid, allowing the method according to the invention to be implemented, which comprises:

an enclosure (1) containing an ebullated-bed reaction zone (100) and a gas overhead (500) at the top, a feed delivery line (20) arranged at the top of said enclosure and opening into gas overhead (500) of said enclosure, inside said enclosure and in its upper part, a liquid collecting means (4) separating the gas overhead from the reaction zone, provided with gas-liquid separators (3) connecting gas overhead (500) and reaction zone (100), a recycling line (30) connected to said means (4) recycling the liquid contained in said means to the bottom of the enclosure, a pipe (6) allowing to extract at the top of the enclosure the non-recycled converted liquid and gas, a gas delivery line (10), the gas being preferably hydrogen, at the bottom of the enclosure.

Advantageously, the reactor comprises at least one separation means (400) located in the gas overhead and opposite line

(20) favouring separation, within the feed, of a vaporized fraction and of a liquid fraction.

Preferably, said means (400) is selected from among distribution plates, perforated plates, structured packings, perforated plates or grates, and a plate is preferably used for its ease of operation.

Said separation means (400) particularly advantageously cooperates with a circulation means for sending the liquid feed directly to recycling line (30).

In general, separation means (400), which is preferably a plate (generally perforated) on which the feed impacts, is located in the gas overhead, and it cooperates with the circulation means comprising a wall (410) forming an extension of means (400) for sending the feed to the periphery of the collecting means and a pipe (250) provided in the collecting means for channelling the feed towards recycling line (30).

Advantageously, gas-liquid separators (3) comprise a gas-liquid inlet (31), a device (32) for rotating the flow, a gas outlet (34) located above liquid outlet (35), the liquid outlet being off-centre in relation to gas-liquid inlet (31) and gas outlet (34).

Preferably, line (20) is located at least 0.5 m above the liquid level, or at least 1 m above the liquid level.

Preferably, collecting means (4) is arranged over essentially the entire cross-section of the enclosure, and it is partly immersed in the liquid.

In an advantageous embodiment, pipe (250) is delimited by a wall (200) of collecting means (4) and a wall (300) connected to wall (410), and it comprises an opening (320) allowing the liquid contained in collecting means (4) to flow into recycling line (30).

Thus, the reactor advantageously comprises at least one means favouring separation, within the feed, of a vaporized fraction and of a liquid fraction, and sending said liquid fraction to reaction zone (100). Said means is arranged in the gas overhead of the enclosure and it can be any means known to the person skilled in the art favouring development of the interfacial area and gas-liquid contact, for example a perforated plate, a distillation plate, a structured packing or a grate. It is preferable to first send the separated liquid fraction to the periphery of the reactor prior to sending it as directly as possible to recycling line (30) allowing introduction into the reaction zone, in order to prevent too large an unconverted liquid fraction to flow through ports (5) and pipe (6).

Collecting means (4) or the recycle cup as described, for example, in document EP-1,275,425 is generally "in abutment" with the lateral walls of enclosure (1), but a play can exist to take into account thermal expansion phenomena and, consequently, a certain fraction of liquid can flow towards the reaction zone via this play.

Figure 4:
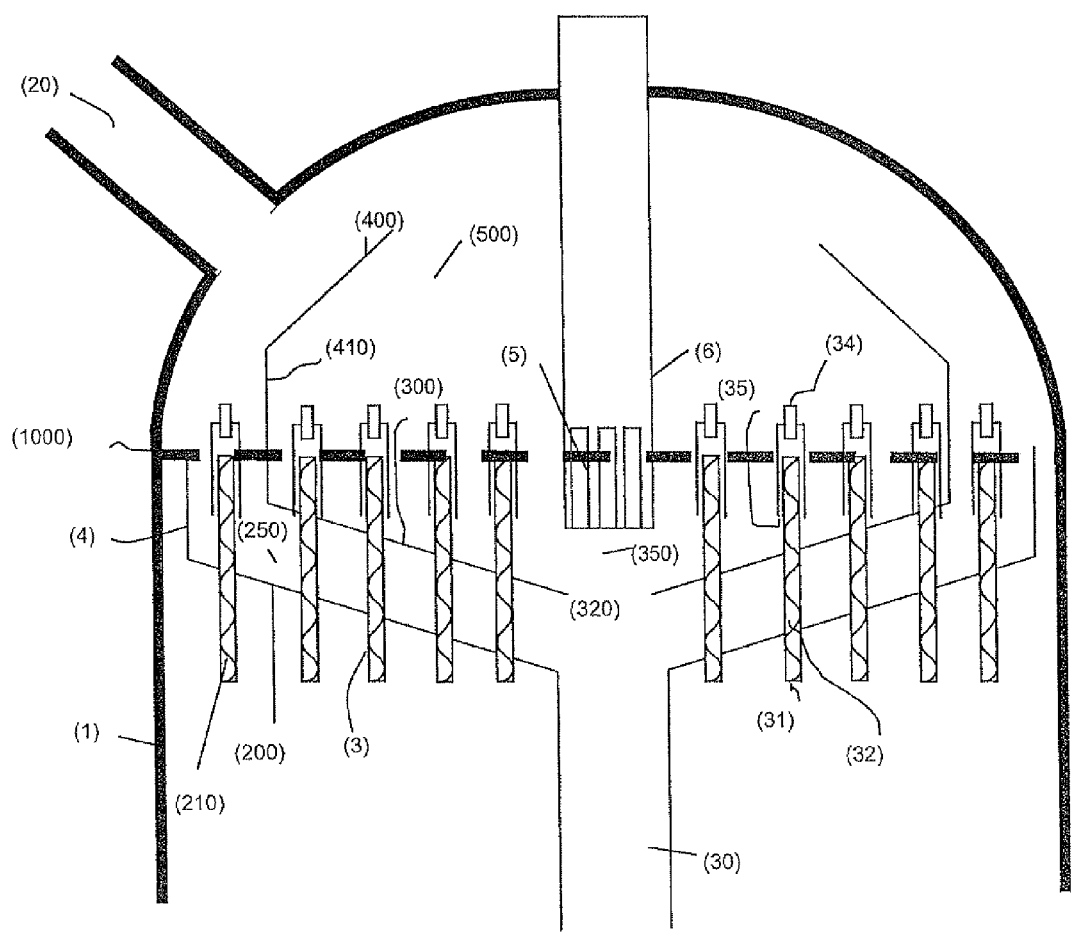
FIG. 4 also illustrates an upper part of a reactor according to the disclosed embodiments.

Said reactor is now described from FIGS. 3 and 4, which show two particular but non limitative embodiments of the invention. In order not to make the description too heavy, FIGS. 3 and 4 only describe the upper part of the reactor that is relative to the invention, the lower part being known in other respects. Elements of FIGS. 1 and 2 are also mentioned in the description hereafter.

It comprises an enclosure (1) provided with a line (20), arranged at the top of the enclosure and opening into gas overhead (500) of the reactor. Line (20) allows to supply the feed preheated to a temperature generally ranging between 200° C. and 500° C., and optionally mixed with make-up hydrogen or a hydrogen-rich recycle gas. Line (20) is preferably located at least 0.5 m above the liquid level in the collecting means or recycle cup (4), more preferably at least 1 m above said liquid level.

Feed delivery line (20) sends the feed to at least one means (400) allowing, on the one hand, to favour contact of the vaporizable fraction of the feed with the gas phase (500) present in the gas overhead of the reactor and, on the other hand, to contribute to sending the liquid fraction of the feed to the catalytic bed by means of a recycling line (30) that reintroduces the liquid feed into the bottom of the enclosure.

Said means (400) can be any means known to the person skilled in the art favouring development of the interfacial area and gas-liquid contact, and it can be, for example, a distillation plate, a structured packing, a perforated plate or a grate.

It is generally arranged opposite the outlet of line (20) so that the feed impacts thereon.

According to the particular embodiment of FIG. 4, the means shown in an advantageous but not limitative manner is a truncated-cone-shaped perforated plate (400) facing line (20) and allowing to favour contact between the vaporized fraction of the feed and gas phase (500). Advantageously, the liquid fraction of the feed trickles on plate (400) and it is then channelled towards the reaction zone by means of a baffle plate or wall (410) that channels the liquid fraction on the reactor periphery, and it then flows into a pipe (250) delimited by walls (200) and (300) respectively belonging to the recycle cup and forming an extension of wall (410). Pipe (250) carries the (unconverted) liquid to internal liquid recycling line (30), then to recycling pump (2), which allows to reinject the liquid into the reactor bottom and to maintain the catalyst under ebullated bed conditions within catalytic bed (100). The element combining plate (400), wall (410) and wall (300) delimits by revolution symmetry a zone (350) rich in hydroconverted liquid and communicating with pipe (250) bringing the unconverted liquid to recycling line (30) through an opening (320).

As shown in FIGS. 3 and 4, the liquid carried by recycling line (30) is brought into contact with the hydrogen injected through line (10) under distribution means (7), it flows through catalytic bed (100) and reacts upon contact therewith. At the outlet of the catalytic bed, the liquid containing the reaction products and the gas fraction containing non-consumed hydrogen and other gases flow through a zone (110) predominantly free of catalyst and whose interface with the gas phase is materialized by level (1000) in recycle cup (4), then they flow into gas-liquid separators (3) comprising a gas-liquid inlet (31), advantageously a device (32) for rotating the flow that can be, for example, a helical helix, a gas outlet (34) arranged above liquid outlet (35), the liquid outlet being off-centre in relation to gas-liquid inlet (31) and gas outlet (34). The gas occupies the space of gas overhead (500) and it is discharged from the reactor through ports (5), then through a pipe (6). Ports (5) and pipe (6) discharge both the gas coming from the reaction zone and the vaporized fraction of the feed that has not contacted the catalytic bed. The essentially degassed liquid from liquid outlet (35) remains in zone (350) of the recycle cup where degassing continues and part thereof is sucked with the gas, and it leaves the reactor through ports (5), then through pipe (6). The rest of the liquid passes through opening (320) and it mixes with the liquid coming from pipe (250) prior to being recycled through recycling line (30) to the reaction zone.

The gas withdrawal means (5, 6) described here, which also allows the converted liquid to be withdrawn, is a particularly advantageous embodiment. Any other gas withdrawal means or any other converted liquid withdrawal means are suitable, whether separate or not.

In FIG. 4, baffle plate (410) and its extension in recycle cup (4) for creating a liquid feed circulation space (250) is also very advantageous. However, the absence of a baffle, or a baffle without an extension are also possible embodiments, although less efficient. Means (400) is also optional, but its absence leads to lesser performances.

Although they are not shown in the figures, the hydroconversion reactor also comprises at least one means for withdrawing the catalyst from said reactor and at least one means for supplying fresh make-up catalyst to said reactor.

The scope of the invention is illustrated by the following example.

EXAMPLE

The feed used for this example is the C5+ fraction of an Arabian heavy crude (C5+ARBH). The C1 to C4 gases were removed in a prior stage, typically upon water/gas/oil separation at the well outlet. The main characteristics of this feed are given in Table 1.

TABLE 1

Characteristics of the C5+ARBH feed

| | C5+ Arabian Heavy |
|---|---|
| API Gravity ° | 27.8 |
| Density (60° F., 15.6° C.) | 0.888 |
| Sulfur (wt. %) | 2.81 |
| Heptane-precipitated asphaltenes (wt. %) | 3.9 |
| CCR (wt. %) | 8.0 |
| V + Ni (ppm) | 75 |

Distillation

| T ° C. | Cumulative mass yield in % |
|---|---|
| 10 | 1.80 |
| 60 | 3.84 |
| 80 | 5.60 |
| 100 | 7.35 |
| 120 | 9.47 |
| 150 | 13.19 |
| 180 | 17.22 |
| 210 | 21.12 |
| 240 | 25.24 |
| 270 | 29.45 |
| 300 | 33.92 |
| 330 | 38.51 |
| 360 | 43.22 |
| 380 | 46.27 |
| 400 | 49.11 |
| 440 | 54.53 |
| 480 | 59.60 |
| 520 | 64.84 |
| 540 | 67.12 |
| 565 | 70.03 |

The hydroconvers on reaction was simulated within a single ebullated-bed type reactor whose dimensions are similar to those of an industrial reactor, typically 4.5 m in diameter. The catalyst used is an alumina-supported nickel-molybdenum catalyst comprising 4.5% NiO and 10% by weight of $MoO_3$, and the amount of catalyst used is the same for all the simulations. The alumina support is extruded and cylindrical. The operating conditions (temperature, pressure) are set at 435° C. and 160 bars (16 MPa). The purity of the make-up hydrogen is 95% by volume.

The fresh feed and hydrogen flow rates are adjusted so as to obtain a hydrogen partial pressure equal to 130 bars (13 MPa) and a gas retention (or volume fraction occupied by the gas) within the reactor of 20%. In the case of simulation No. 1, where injection of the feed is carried out according to the state of the art, at the reactor bottom, as shown in FIG. 1 (line 20), it can be observed that these gas retention and hydrogen partial pressure values are reached for a C5+ARBH feed flow rate of 235,000 kg/h and a hydrogen flow rate of 10,700 kg/h. The reactor LHSV, defined as the ratio of the volume flow rate of feed to the volume of the reactor, is 0.54 $h^{-1}$. The net mass conversion of the products whose boiling point is above 540° C.+ is then 55.5%. Under suitable catalyst renewal conditions, the HDS obtained is 79.4%.

In order to quantify the gains provided by implementing the invention, we simulate the case where the same amount of feed is fed into the gas overhead of the reactor, through line (20) of FIG. 2. The simulation conditions are such that the feed is first flashed under the reactor conditions (435° C.-16 MPa) with the gases coming from the reaction zone and that have flowed through gas-liquid separators (210). It can be observed that 21.1% by weight of the fresh feed introduced is vaporized. This vaporized fraction bypasses the reaction zone and it is extracted from the reactor. Under such conditions, calculations show that, for a reactor of same size and supplied with the same feed, at the same flow rate and under the same operating conditions, the overall performances are clearly improved. In fact, a very significant gain is observed in terms of conversion of the compounds whose boiling-point temperature is above 540° C. (11.1 points). In teens of hydrodesulfurization, an overall HDS gain of 3.7 points is globally observed at the reactor boundaries in relation to simulation No. 1. It can also be noted that the new gaseous volume fraction within the reaction zone is 18%, which is less than in the simulation with injection at the reactor bottom and gives some latitude for possibly more severe conditions and for improving the performances even further.

Besides, the 540° C.+ concentration of the liquid feed is higher in simulation No. 2, which allows better conversion of the heavier compounds (>540° C+). The results of the two simulations, with injection at the reactor bottom (No. 1, not in accordance with the invention) and with injection at the reactor top (No. 2, according to the invention), are summed up in Table 2.

TABLE 2

Results of the two simulations at iso conditions and iso feed flow rate

| 435° C./16 MPa | Simulation No. 1 | Simulation No. 2 |
|---|---|---|
| C5+ARBH feed injection point | reactor bottom | reactor top |
| Flow rate at reactor inlet (kg/h) | 235,000 | 235,000 |
| Fresh feed flow rate at catalytic bed inlet (kg/h) | 235,000 | 185,392 |
| Real residence time (h) | 1.19 | 1.71 |
| $ppH_2$ (MPa) | 13 | 13 |
| Make-up hydrogen (kg/h) | 10,700 | 10,050 |
| Conversion to 540° C.+ (wt. %) | 55.5 | 66.6 |
| Overall HDS (wt. %) | 79.4 | 83.1 |

The advantages of the invention can also be quantified in terms of capacity. A third simulation (No. 3) is therefore carried out by calculating the flow rate of liquid from the flash that can be injected into the reaction zone while maintaining a gaseous volume fraction of 20%. The operating conditions are identical to the previous simulations (435° C.-16 MPa). The hydrogen flow rate is adjusted in order to obtain a hydrogen partial pressure of 13 MPa. The flash calculation conditions allowing to go back to the flow rate at the reactor inlet are kept identical to those of simulation No. 2.

The results of simulation No. 3 are given and compared with simulation No. 1 in Table 3. It can be seen that it is possible to go from 235,000 kg.h of treated C5+ARBH feed (simulation No. 1, not in accordance with the invention) to 254,920 kg/h (simulation No. 3, according to the invention), i.e. a mass gain of 8.5%. Implementation of the method according to the invention leads to much better performances: +8.4 points for 540° C.+ conversion and +2.2 points HDS.

TABLE 3

Results of simulations No. 1 and No. 3

| 435° C./16 MPa | Simulation No. 1 | Simulation No. 3 |
|---|---|---|
| C5+ARBH feed injection point | reactor bottom | reactor top |
| Flow rate at reactor inlet (kg/h) | 235,000 | 254,920 |
| Fresh feed flow rate at catalytic bed inlet (kg/h) | 235,000 | 210,500 |
| ppH$_2$ (MPa) | 13 | 13 |
| Make-up hydrogen (kg/h) | 10,700 | 10,940 |
| Conversion to 540° C.+(wt. %) | 55.5 | 63.9 |
| Overall HDS (wt. %) | 79.4 | 81.6 |

The invention claimed is:

1. A method of hydroconverting a petroleum feed in at least one ebullated-bed reactor having a bottom, and a top comprising a gas overhead, said, method comprising
   a) injecting said feed at the top of the reactor in the gas overhead,
   b) separating said feed into a vaporized. fraction, under the temperature and. pressure conditions of the reactor, and a liquid fraction said separation being conducted inside the gas overheard through separation means, wherein said separation means cooperates with circulation means for sending the separated liquid fraction directly to a recycling line allowing its introduction into the reactor,
   c) to conduct hydroconversion in said reactor, contacting said liquid, fraction with at least one hydroconversion catalyst with hydrogen under such conditions that the absolute pressure ranges between 3 and 50 MPa, the temperature between 300° C. and 550° C., the hourly space velocity between 0.05 and 5 h$^{-1}$, and obtaining a hydroconverted effluent,
   d) extracting said vaporized fraction and. a fraction of the hydroconverted effluent at the reactor top, and
   e) recycling at least part of resultant non-extracted hydroconverted effluent fraction from the top of the reactor to the bottom of the reactor.

2. A method as claimed in claim 1, wherein the petroleum feed contains at least 30% by weight of compounds whose boiling-point temperature is above 350° C. and at least 10% by weight of compounds whose boiling-point temperature is below 340° C.

3. A method as claimed in claim 1, wherein the petroleum feed contains at least 20% by weight of compounds having a boiling-point temperature above 540° C.

4. A method as claimed in claim 1, wherein the petroleum feed is a crude oil.

5. A method as claimed in claim 1, comprising no distillation stage upstream from said method.

6. A method as claimed in claim 1 wherein said at least one ebullated bed reactor comprises 1 to 3 reactors in series.

7. A method as claimed in claim 6, wherein the number of reactors in series is 2.

8. A method as claimed in claim 1, wherein hydroconversion. is operated at an absolute pressure ranging between 3 and 50 MPa, at a temperature ranging between 380° C. and 450° C., with an hourly space velocity ranging between 0.05 and 5 h$^{-1}$.

9. A method as claimed in claim 1, wherein hydroconversion is operated at an absolute pressure ranging between 8 and 20 MPa, at a temperature ranging between 380° C. and 450° C., with an hourly space velocity ranging between 0.2 and 1 h$^{-1}$.

10. A method as claimed in claim 1, wherein the hydroconversion catalyst contains at least one group VIII metal.

11. A method as claimed in claim 10, wherein the hydroconversion catalyst contains 0.5 to 10% by weight of nickel or cobalt and 1 to 30% by weight of molybdenum.

12. A reactor operating under ebullated bed conditions, in the presence of a catalyst, gas and. liquid for conducting the method of claim 1, comprising:
   an enclosure (1) containing an ebullated-bed reaction zone (100) and a gas overhead (500) at the top,
   a feed delivery line (20) arranged at the top of said enclosure and opening into gas overhead (500) of said enclosure,
   inside said enclosure and in its upper part, a liquid collecting means (4) separating the gas overhead from the reaction zone, provided with gas-liquid separators (3) connecting gas overhead (500) and reaction zone (100),
   a recycling line (30) connected to said liquid collecting means (4) recycling the liquid contained in said means to the bottom of the enclosure,
   a pipe (6) allowing to extract at the top of the enclosure the non-recycled converted liquid and gas,
   a gas delivery line (10) arranged at the bottom of the enclosure, and
   at least one separation means (400) located in the gas overhead and opposite line (20) configured to separate, within the feed, a vaporized fraction and a liquid fraction, wherein said separation means (400) cooperates with a circulation means for sending the liquid feed directly to recycling line (30).

13. A reactor as claimed in claim 12, wherein said separation means (400) is selected from among distribution plates, structured packings, plates, grates.

14. A reactor as claimed in claim 12, wherein separation means (400), on which the feed impacts, is located in. the gas overhead, and it cooperates with the circulation means comprising a wall (410) forming an extension of means (400) for sending the feed to the periphery of the collecting means and a pipe (250) provided in the collecting means for channelling the feed towards recycling line (30).

15. A reactor as claimed in claim 14, wherein means (400) is a plate.

16. A reactor as claimed in claim 12, wherein gas-liquid separators (3) comprise a gas-liquid inlet (31), a device (32) for rotating the flow, a gas outlet (34) located above liquid outlet (35), the liquid outlet being off-center in relation to gas-liquid inlet (31) and gas outlet (34).

17. A reactor as claimed in claim 12, wherein said feed delivery line (20) is located at least 0.5 m above the liquid level.

18. A reactor as claimed in claim 17, wherein said feed delivery line (20) is located at least 1 m above the liquid level.

19. A reactor as claimed in claim 12, wherein said liquid collecting means (4) is arranged over essentially the entire cross-section of the enclosure, and is partly immersed in the liquid.

20. A reactor as claimed in claim 19, wherein a pipe (250) is delimited by a wall (200) of said liquid collecting means (4) and a wall (300) connected to wall (410), and said pipe (250) comprises an opening (320) allowing liquid contained in said liquid collecting means (4) to flow into said recycling line (30).

* * * * *